Nov. 13, 1956     B. M. GALPERIN     2,770,134
PRESSURE GAUGE
Filed May 31, 1955
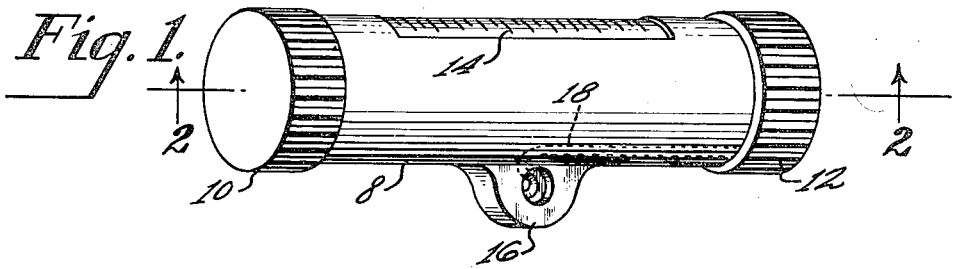
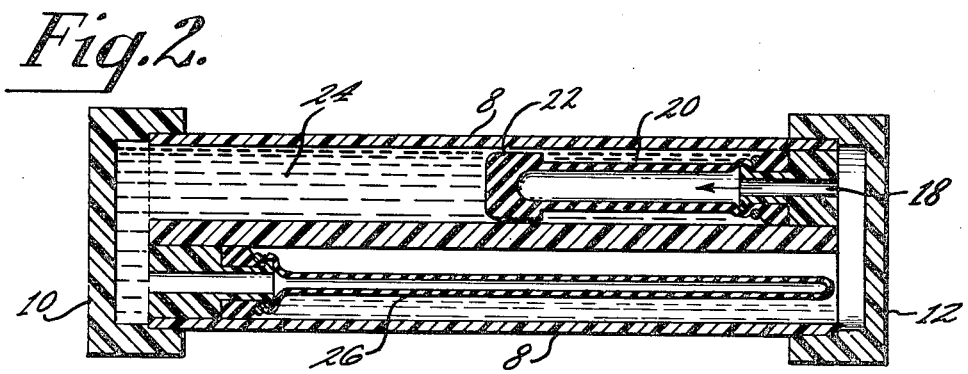
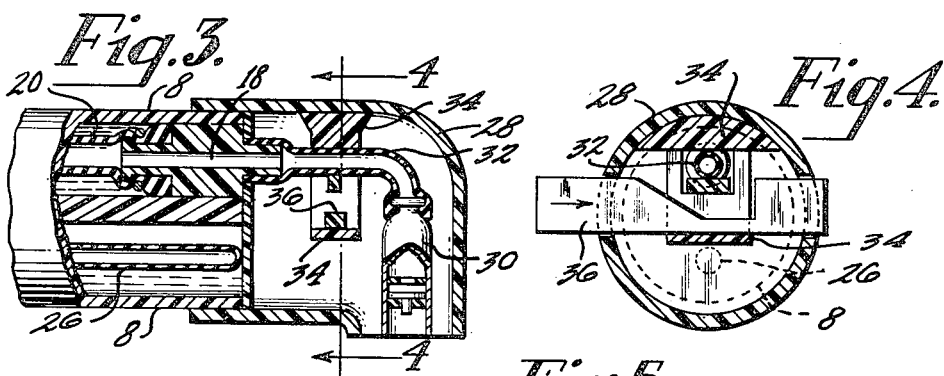
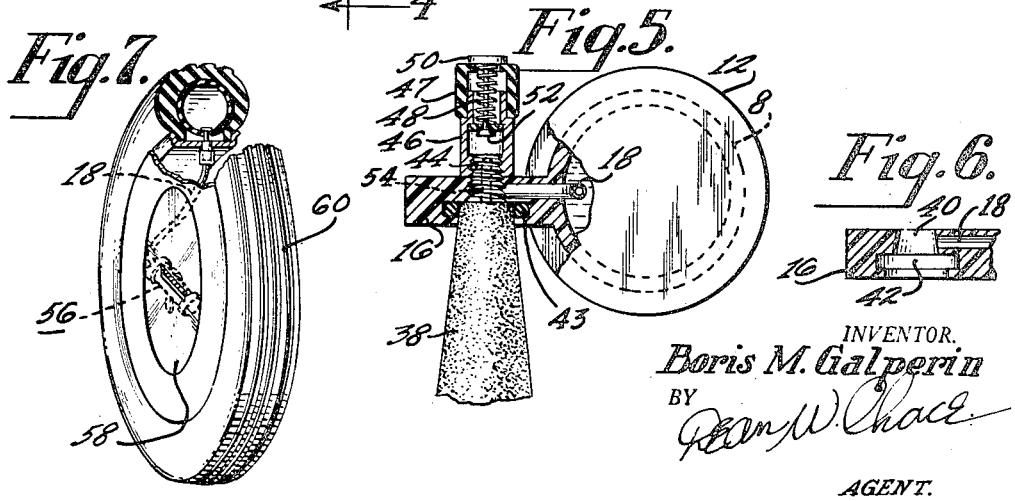
INVENTOR.
*Boris M. Galperin*
BY
AGENT.

United States Patent Office 2,770,134
Patented Nov. 13, 1956

2,770,134

PRESSURE GAUGE

Boris M. Galperin, Philadelphia, Pa.

Application May 31, 1955, Serial No. 511,900

9 Claims. (Cl. 73—390)

This invention relates to pressure gauges, and in particular to pressure gauges for measuring and indicating the pressure of pneumatic tires.

One of the important considerations in the safe operation of an automobile, and as well to the useful life of the tires of the automobile is the pressure of the air within the tires. Tire pressure, as is well known, is extremely variable not only with weather conditions but with driving conditions. Thus service stations are invariably equipped with a pressure gauge to check the pressure of the tires, and often the owner of the automobile carries a gauge in the automobile so that he is able to check the pressure in his tires at any time. Unfortunately, however, the commercially available gauges are subject to inaccurate readings, can be broken easily and are usually open at least at one end so that dirt can enter and foul their operation. Few are susceptible to calibration and the available gauges which are not prone to most of these difficulties are complex in construction and prohibitive in cost to the average automobile owner.

It is, accordingly, an object of this invention to provide an improved pressure gauge for measuring the pressure of pneumatic tires which is simple in construction and reliable in operation.

It is another object of the present invention to provide an improved pneumatic tire pressure gauge which is relatively inexpensive and extremely durable in construction.

It is yet another object of this invention to provide an improved pressure gauge for pneumatic tires and the like which may be easily calibrated if desired, which is accurate in operation and which is so constructed as to prohibit the entry of dirt and other foreign matter.

Of the known pressure gauges, some utilize a spring in conjunction with other parts to provide the pressure indications. Springs are easily damaged, however, and their tension is readily altered with wear and hard use so that the readings eventually become inaccurate. As an alternative to a spring or in conjunction therewith, some of the prior art gauges have utilized resilient members made from rubber or rubber-like material. One difficulty with the use of a resilient member is that it is subject to cracking and deterioration with age and use since it is open to the air and not lubricated.

It is, accordingly, a still further object of the present invention to provide an improved pressure gauge which does not require the use of a spring and which is self-lubricating.

While portable or pocket pressure gauges are extremely useful and perform their desired function, they are easily mislaid or lost. Moreover, some inconvenience is associated with their use since the valve cap of each tire must be removed before a pressure reading can be made. Accordingly, pressure gauges have been devised in the past which attach permanently to the tire in some fashion so that the tire pressure can readily be ascertained without the necessity of removing each valve cap. Unless such a gauge is small and light in weight, it may contribute to the unbalance of the automobile wheels, which is, of course, undesirable. In addition, most of the prior art gauges if detached from the tire by accident will deflate the tire. This, too, is an undesirable feature. Such a gauge should also give an accurate reading irrespective of the position in which the tire comes to rest.

It is, therefore, another object of the invention to provide an improved pressure gauge for pneumatic tires which can be permanently attached to the tire valve.

It is a still further aim of the present invention to provide an improved tire pressure gauge which may be permanently attached to the tire and which is lightweight in construction and accurate in operation under all operating conditions.

Yet another object of the present invention is to provide an improved tire pressure gauge which may be readily adapted for permanent attachment to the tire and which will not deflate the tire if accidently loosened or removed from the tire.

These and further objects and advantages of the present invention are achieved by a pressure gauge in which three chambers or enclosures are provided. The first of these may be referred to as an expansion chamber and consists of a resilient member which is closed at one end and open to the air, the pressure of which is to be measured, at the other end. The second chamber may be referred to as the liquid chamber and contains a liquid which is preferably not readily susceptible to temperature variations and which is also an acceptable lubricant to the resilient member. The third chamber may be referred to as the compression chamber and also contains a resilient member. This latter member is closed at one end and open at its other end so as to readily receive the liquid from the second chamber. The resilient member of the third chamber is surrounded by an air and liquid mixture, the liquid being the same as the liquid in the second chamber.

When the gauge is exposed to the air pressure within a tire, the first resilient member expands and forces some of the liquid in the second chamber into the second resilient member. The second member thus expands and equilibrium is attained when the air surrounding the second resilient member is compressed. By providing a suitable indicating scale, the amount the first resilient member expands will provide an indication of the tire pressure.

A gauge so constructed can be readily adapted, by provision of the invention, to serve as either a portable or pocket pressure gauge or as a tire gauge which is permanently affixed to the tires of the automobile. To this end, separate adapter means are provided, in accordance with the invention, for accomplishing each of these different functions of the gauge.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a side view in perspective of a pressure gauge embodying the invention;

Figure 2 is a sectional view taken on the line 2—2 of the pressure gauge shown in Figure 1;

Figure 3 is a cross-sectional view of a gauge adapter for adapting a gauge of the same general type illustrated in Figures 1 and 2 for portable use and embodying the invention;

Figure 4 is a sectional view taken on the line 4—4 of the gauge adapter shown in Figure 3;

Figure 5 is a view, partially in section, of an adapter assembly for permanently attaching a gauge of the type illustrated in Fig. 1 to a tire and embodying the invention;

Figure 6 is a cross-sectional view of a portion of the adapter assembly illustrated in Figure 5; and Figure 7 is a partially cross-sectioned view in perspective of one method of permanently attaching the gauge to a pneumatic tire in accordance with the invention.

Referring now to the drawing, wherein like parts are indicated by like reference numerals throughout the figures, and referring in particular to Figure 1, a pressure gauge embodying the invention comprises a substantially cylindrical casing 8, which is closed at both ends by caps 10 and 12. The casing 8 need not take any particular form, but is preferably cylindrical since this shape lends itself best to a compact structure. In addition, the casing 8 is preferably but not necessarily constructed of plastic, plastic being preferred because it is light in weight, durable and easily molded. A portion of the casing 8 is provided with a scale 14. If the casing 8 is made from a transparent plastic, the scale could be attached to either the outside or inside wall of the casing. If the casing 8 is not transparent, then the scale 14 would show through a window portion of the casing.

A gauge embodying the invention is easily adapted, in accordance with the teachings of the invention, to be permanently mounted on the tires of an automobile or may be used as a portable gauge. In the form of the invention illustrated in Figure 1, the gauge is adapted for the former use. To this end, an adapter or coupling member 16 is provided which is permanently attached or bonded to the casing 8. The coupling member 16 is adapted to be attached to the valve stem of a tire as will be seen more clearly from a consideration of Figures 5 and 6 and contains a port or cylindrical passage 18 through which air is delivered to the inside portion of the casing 8. The port 18 may extend in any desired manner from the coupling member 16 to one end of the casing.

Referring now to Figure 2, the air port 18 is terminated in the open end of an expansion chamber which includes a tubular member 20 which is permanently mounted inside the casing 8 and extends along a small portion of the length thereof. The tubular member 20 is made from a resilient expandable material such as thin rubber or plastic and is terminated in a closed end portion 22 which may also be made of rubber or similar material and provides a reinforced end piece for the expansion chamber as well as an indicating element for the gauge.

A liquid chamber 24 is also provided inside the casing 8 and extends from the ends 22 of the tubular member 20 to the far end of the casing 8 which is terminated by the cap 10. Inside the liquid chamber 24 is a viscous liquid. For these purposes it has been found that an emulsion comprising glycerin and a saponified fatty acid in proper proportions is ideally suited. This emulsion has lubricating and preservation properties and its viscosity does not change to any appreciable extent with temperature. The glycerin and acid emulsion inside the chamber 24 is airtight and surrounds the tubular member 20, acting as a lubricant and preservative therefor.

The third chamber within the casing 8 may be referred to as the compression chamber and includes a second tubular member 26 which is mounted by any suitable means inside the casing 8 as shown and has an open end portion which is exposed to the liquid chamber 24. The tubular member 26 extends from the open or mounted end along the length of the casing 8 to substantially its other end, which is terminated by the cap 12. The tubular member 26 is also constructed of a resilient and expandable matrial such as thin rubber or plastic.

The space between the casing 8 and the tubular member 26 contains a predetermined small amount of liquid, which may be of the same type as the liquid in the liquid chamber 24, as well as air. This liquid could also be glycerin alone or any other suitable liquid. The liquid which is contained in this space serves two purposes: (1) it acts as a lubricant and preservative for the tubular member 26, and (2) it serves as a means for calibrating the gauge. To accomplish this second function, a hole may be provided in the casing 8 through which liquid may be taken from this space or more liquid added. After the liquid is withdrawn or more is put in the space surrounding the member 26, the hole in the casing would be sealed. By withdrawing or adding liquid, the compressible volume of air contained in this space is either decreased or increased, thus providing a simple method for calibrating the gauge.

In operation, air, under pressure, is admitted to the gauge via the port or passage 18, through which it passes to the resilient tubular member 20. The tubular member 20 is thus expanded by an amount dependent on the pressure of the air to which it is exposed. Due to the expansion of the tubular member 20, a portion of the liquid within the liquid chamber 24 will be expelled from the chamber 24 and will enter the tubular member 26 of the compression chamber, the amount of liquid so entering being dependent on the amount the tubular member 20 of the expansion chamber expands.

By forcing liquid into the tubular member 26 it will also expand, principally in a lateral direction. This lateral expansion of the tubular member 26 will compress the volume of air surrounding it until an equilibrium condition is reached between the pressure and volume of the air which is being measured and the pressure of the air which is compressed within the space surrounding the tubular member 26. By suitably calibrating the gauge, the position of the reinforced end portion 22 of the tubular member 20 or a marking thereon will provide an accurate pressure reading. This reading can be made in conjunction with the scale 14 as shown in Figure 1, so that, for example, readings of pressure in pounds per square inch can conveniently be made. The scale can be suitably marked with colored bands so that a warning of an undesirable or unsafe pressure reading is instantly indicated.

As described, a pressure gauge embodying the invention is seen to be simple in construction and reliable in operation. A gauge of this type can be easily constructed of lightweight materials, such as plastic and rubber and is durable and not easily broken. A gauge embodying the invention can also readily be calibrated and since none of the parts are exposed, the entry of foreign matter is practically impossible. Furthermore, complex and easily broken moving mechanical parts are not needed and the rubber elements are lubricated by the liquid used.

As was mentioned hereinbefore, a gauge embodying the invention may be conveniently permanently attached to the tires of an automobile or may be used as a portable gauge. To adapt the gauge to this latter use, an adapter unit of the type illustrated in Figures 3 and 4 may be used. The adapter comprises a casing 28 which would normally replace the end cover 12 of the gauge and would be permanently attached to the casing 8 of the gauge itself as shown in Figure 3.

The adapter is provided with a standard valve asembly 30 which is operative to release air from the tire when it is pressed against the valve of the tire. The air so released enters through the valve 30 and into a coupling tube 32. The tube 32 is made from a resilient material such as rubber or plastic and is coupled to the air port or passage 18 of the gauge. Accordingly, the air released from the tube passes into the tubular member 20 and expands it as described in connection with Figure 2.

To prevent the escape of air from the gauge once it has been exposed to the air pressure, a solid plastic block 34 is provided, the top and bottom portions of which rest against the tubing 32 and are spaced so that the tubing 32 is snugly fitted between these portions. A metallic or plastic bar 36 is also provided which passes through the block 34 and is adapted to move longitudinally through the block. The bar 36 is so shaped, however, that as it is moved longitudinally it will move the block 34 in a vertical direction. By this expedient the tubing 32 will be clamped shut, thus trapping the air within the casing 8 of the gauge. Accordingly, the gauge may be removed from the tire and a pressure reading made. It is evident that by providing an adapter of this type that a gauge embodying the invention is easily and readily adapted for use as a portable pressure gauge.

A gauge of the type described may also be adapted, in accordance with the invention, to be permanently attached to the valve of a tire, providing thereby an instantaneous pressure reading. This is accomplished by an adapter assembly of the type illustrated in Figure 5 where a gauge of the same general type described hereinbefore, and having a casing 8 and an end cover 12, is permanently attached to the valve assembly 38 of a pneumatic tire. To accomplish this, an adapter or coupling member 16 is provided which has two concentric holes 40 and 42, as shown in Figure 6. The hole 40 has a smaller diameter than the hole 42 to form a shoulder, against which the base portion of the valve assembly to which the threaded valve stem 44 is attached snugly fits as shown in Figure 5. A washer 43 may be placed between the shoulder and the valve assembly to insure an airtight fit. The air port or passage 18 extends from the side smaller hole 40 through the body of the adapter 16.

The threaded valve stem 44 of the tire valve assembly extends through the small diameter hole 40 of the adapter 16 and its upper half is exposed above the surface of the adapter 16. The fit between the threaded valve stem 44 and the inside walls of the hole 40 is such that air is able to pass therebetween and into the port 18 for delivery into the gauge. A cap 46 is also provided, the lower portion of which is tapped so that the cap can be screwed into engagement with the valve stem 44. This fit is such that air is permitted to flow between the stem 44 and the cap 46.

The cap 46 is provided with a spring biased plunger 48 which is terminated at its upper end in a disc or button 50 of circular cross section. A cylindrical rubber member 47 is fitted over the top of the cap 46. The disc or button 50 has a diameter of such a size that when the plunger is depressed, the disc 50 presses tightly against the top of the rubber member 47 and prevents the escape of air. The lower end of the plunger 48 is terminated in another disc 52 which presses against the pin 54 of the tire valve assembly when the plunger 48 is depressed.

In operation, the depression of the plunger 48 by manually pressing the cap 50 will depress the pin 54 of the tire valve assembly. In this manner air is allowed to escape from the tire and into the cap 46. The cap 46 is airtight at its upper end, however, so that the only available channel permitting the escape of the air is between the threaded valve stem 44 and the cap 46 as well as the inside walls of the hole 44 of the adapter. Accordingly, the air passes through the port 18 into the gauge which then gives a pressure reading.

The adapter assembly illustrated in Figures 5 and 6 is seen to provide a convenient means for attaching a tire gauge permanently to the valve of a tire. Since the adapter and gauge so attached are small in size and light in weight, there is no danger that they will in any way contribute to the unbalance of the wheel. Furthermore, in case the cap of the adapter becomes loosened, the tire will not deflate. By pressing the exposed disc of the cap a pressure reading is immediately obtained on the gauge. The tires of the car may be deflated or inflated, on the other hand, merely by unscrewing the cap of the adapter assembly which exposes the valve stem of the tire.

Instead of attaching the gauge directly to the valve of the tire, it may be desired to mount the gauge on the hub cap of the tire. This is illustrated in Figure 7 where a gauge 56 is mounted on the inside of a hub cap 58 of a tire 60. The gauge could also be attached to the outside of the hub cap with a clamp, for example, preferably, however, the gauge is mounted on the inside of the hub cap, which is provided with a cutout portion or window through which the scale of the gauge is visible as shown in Figure 7. The air port or passage 18 extends from the gauge 56 in the form of a rubber or plastic tube which is coupled with the adapter 16. The adapter assembly is then connected as shown in Figures 5 and 6 to provide the coupling means between the gauge and the tire valve. By depressing the plunger in the cap of the adapter assembly, air is admitted to the gauge 56 which then registers a pressure reading as described in connection with Figure 2.

As described herein, a tire pressure gauge is accurate in operation and may be constructed of light weight and durable materials. The gauge is easy to calibrate and relatively inexpensive to make. Such a gauge can easily be adapted, moreover, by the adapter means described, for use as either a portable gauge or a permanent gauge which is mounted on the valve assembly of the tire. Thus reliability, durability, ease of construction as well as versatility characterize a gauge embodying the invention.

What is claimed is:

1. A pressure gauge for measuring and indicating the air pressure of a pneumatic tire comprising, in combination, a casing, means providing a port in said casing for delivering air thereto from said tire, means providing an expansion chamber in said casing and including a first resilient tubular member supported in said casing and having a closed reinforced end portion and an open end portion which is connected with said port for admitting air from said tire to said resilient member, said resilient member being adapted to expand within said casing in response to air pressure, means providing a liquid chamber within said casing and containing therein a viscous liquid having lubricating properties, the space between said casing and the outside walls of said resilient member containing said liquid for lubricating the resilient member, and a second resilient tubular member supported in said casing at one end of said liquid chamber and having a closed end portion which is adjacent one end of said casing and an open end portion for admitting said liquid into the second resilient member in response to the expansion of said first resilient member, the space between said casing and the outside walls of said second resilient member containing said liquid for lubricating said second resilient member and air which is compressed in response to the expansion of said second resilient member until an equilibrium condition is established whereby the expansion of said first resilient member provides an indication of said pressure.

2. A pressure gauge as defined in claim 1 wherein said liquid contains an emulsion of gylcerin and a saponified fatty acid.

3. A pressure gauge as defined in claim 1 wherein said first and second resilient members comprise resilient tubes, each of which is supported in said casing at said open end portions.

4. A pressure gauge for measuring the air pressure of a pneumatic tire comprising, in combination, a casing, means providing an expansion chamber in said casing and including a first resilient member supported in said casing and having a closed end portion and an open end portion, said resilient member being adapted to expand within said casing in response to air pressure, adapter means supported at the end of said casing near said resilient member and including a valve assembly which is adapted to open for admitting air from a tire, a resilient coupling means in said adapter providing an air passage from said valve assembly to said first resilient member, means in said adapter for constricting the walls of said coupling means to prevent the escape of air from said gauge when a pressure reading is made, means providing a liquid chamber within said casing and containing therein a liquid, and a second resilient member supported in said casing at one end of said liquid chamber and having a closed end portion which is adjacent one end of said casing and an open end portion for admitting said liquid into the second resilient member in response to the expansion of said first resilient member.

5. A permanently mounted pressure gauge for measuring and indicating the air pressure of a pneumatic tire having a valve stem, a valve pin and a base member, comprising, in combination, a casing, means providing an expansion chamber in said casing and including a first resilient tubular member supported in said casing and having a closed reinforced end portion and an open end portion, coupling means for attaching said gauge to said pneumatic tire, means providing a pair of concentric holes in said coupling means for different diameters and forming a shoulder therein which is adapted to fit against said base member, said valve stem extending through the smallest diameter hole in said coupling means, means providing an air port through said coupling means from said smallest diameter hole to the open end of said first resilient member, a cap member coupled with said valve stem and including a spring biased plunger for depressing said valve pin when said plunger is manually depressed for admitting air through said port to said first resilient member, said resilient member being adapted to expand within said casing in response to air pressure, means providing a liquid chamber within said casing and containing a liquid therein, and a second resilient tubular member supported in said casing at one end of said liquid chamber and having a closed end portion which is adjacent one end of said casing and an open end portion for admitting said liquid into the second resilient member in response to the expansion of said first resilient member, the space between said casing and the outside walls of said second resilient member containing said liquid for lubricating said second resilient member and air which is compressed in response to the expansion of said second resilient member until an equilibrium condition is established whereby the expansion of said first resilient member provides an indication of said pressure.

6. A permanently mounted pressure gauge as defined in claim 5 wherein said gauge is mounted on the hub cap of a pneumatic tire and said means providing an air port from said smallest diameter hole to the open end of said first resilient member includes a tube extending from said coupling means to said gauge.

7. A pressure gauge for measuring the pressure of an enclosed volume of gas comprising, in combination, a casing, means providing an expansion chamber in said casing and including a first resilient tubular member supported in said casing and having a closed end portion and an open end portion, said resilient tubular member being adapted to expand within said casing in a longitudinal direction and in close proximity to the walls of said casing in response to gas pressure, means providing a liquid chamber within said casing and containing therein a liquid having lubricating properties and adapted to be moved in response to the expansion of said first resilient tubular member, and means providing a compression chamber in said casing and including a second resilient tubular member supported in said casing at one end of said liquid chamber and adapted to resist the movement of said liquid as said first resilient tubular member expands in a longitudinal direction in said casing until an equilibrium condition is established whereby the longitudinal expansion of said first resilient member provides an indication of said gas pressure.

8. A pressure gauge as defined in claim 7 wherein said first resilient tubular member is provided with pressure marking means.

9. A pressure gauge as defined in claim 8 wherein a scale is provided adjacent said first resilient tubular member to provide a pressure reading in accordance with the position of said pressure marking means relative to said scale as said first resilient member expands in response to pressure.

References Cited in the file of this patent
UNITED STATES PATENTS

| | | |
|---|---|---|
| 1,093,397 | Goetze | April 14, 1914 |
| 1,238,249 | Benson | Aug. 28, 1917 |
| 2,190,530 | Clarkson | Feb. 13, 1940 |
| 2,660,890 | Fletcher | Dec. 1, 1953 |

FOREIGN PATENTS

| | | |
|---|---|---|
| 935,275 | France | Feb. 2, 1948 |